United States Patent [19]

Henry et al.

[11] Patent Number: 5,742,274
[45] Date of Patent: Apr. 21, 1998

[54] VIDEO INTERFACE SYSTEM UTILIZING REDUCED FREQUENCY VIDEO SIGNAL PROCESSING

[75] Inventors: Keith E. Henry, Tyngsboro; Barry N. Mansell, Groton; Burt Hashizume, Littleton, all of Mass.

[73] Assignee: PixelVision Inc., Acton, Mass.

[21] Appl. No.: 538,116

[22] Filed: Oct. 2, 1995

[51] Int. Cl.⁶ .................. G09G 5/00; G09G 5/04
[52] U.S. Cl. .................. 345/132; 345/154; 345/203
[58] Field of Search .................. 345/132, 154, 345/202, 203; 348/446, 441, 443, 430

[56] References Cited

U.S. PATENT DOCUMENTS

| | | |
|---|---|---|
| 4,386,367 | 5/1983 | Peterson et al. .................. 348/446 |
| 4,393,414 | 7/1983 | Reitmeier . |
| 4,628,344 | 12/1986 | Glenn . |
| 4,639,783 | 1/1987 | Fling .................. 348/446 |
| 4,661,862 | 4/1987 | Thompson . |
| 4,682,225 | 7/1987 | Graham . |
| 4,885,787 | 12/1989 | Okamoto et al. . |
| 5,034,817 | 7/1991 | Everett, Jr. . |
| 5,057,932 | 10/1991 | Lang . |
| 5,140,147 | 8/1992 | Barnett . |
| 5,164,839 | 11/1992 | Lang . |
| 5,229,853 | 7/1993 | Myers . |
| 5,229,855 | 7/1993 | Siann . |
| 5,233,421 | 8/1993 | Chrisopher . |
| 5,264,939 | 11/1993 | Chang . |
| 5,289,281 | 2/1994 | Perry et al. .................. 348/521 |
| 5,291,275 | 3/1994 | Lumelsky .................. 348/441 |
| 5,337,089 | 8/1994 | Fisch .................. 348/446 |

Primary Examiner—Jeffery Brier
Attorney, Agent, or Firm—Weingarten, Schurgin, Gagnebin & Hayes LLP

[57] ABSTRACT

A video interface system which samples an input video signal to capture a subset of pixels from first and second frames of the signal. A frame buffer temporarily stores the captured subsets of pixels from the first and second frames and a display interface unit reads the stored pixels out of the frame buffer for transfer to a flat panel display. The subsets of pixels from the first and second frames are interleaved on the display to provide a video image. The display is updated by replacing one of the displayed subsets of pixels with a subset of pixels captured from a subsequent frame of the video signal. In one embodiment, the subset of captured pixels from the first frame includes those pixels for which the sum of the respective row and column numbers is either odd or even and the subset of captured pixels from the second frame includes those pixels for which the sum of the respective row and column numbers is even or odd.

20 Claims, 9 Drawing Sheets

FIG. 5

FRAME 1 (250)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FRAME 2 (252)

| 0' | 1' | 2' | 3' | 4' | 5' | 6' | 7' |
|---|---|---|---|---|---|---|---|
| 8' | 9' | 10' | 11' | 12' | 13' | 14' | 15' |
| 16' | 17' | 18' | 19' | 20' | 21' | 22' | 23' |
| 24' | 25' | 26' | 27' | 28' | 29' | 30' | 31' |
| 32' | 33' | 34' | 35' | 36' | 37' | 38' | 39' |
| 40' | 41' | 42' | 43' | 44' | 45' | 46' | 47' |
| 48' | 49' | 50' | 51' | 52' | 53' | 54' | 55' |
| 56' | 57' | 58' | 59' | 60' | 61' | 62' | 63' |

FRAME 3 (254)

| 0" | 1" | 2" | 3" | 4" | 5" | 6" | 7" |
|---|---|---|---|---|---|---|---|
| 8" | 9" | 10" | 11" | 12" | 13" | 14" | 15" |
| 16" | 17" | 18" | 19" | 20" | 21" | 22" | 23" |
| 24" | 25" | 26" | 27" | 28" | 29" | 30" | 31" |
| 32" | 33" | 34" | 35" | 36" | 37" | 38" | 39" |
| 40" | 41" | 42" | 43" | 44" | 45" | 46" | 47" |
| 48" | 49" | 50" | 51" | 52" | 53" | 54" | 55" |
| 56" | 57" | 58" | 59" | 60" | 61" | 62" | 63" |

DISPLAY 1 (256)

| 0 | 1' | 2 | 3' | 4 | 5' | 6 | 7' |
|---|---|---|---|---|---|---|---|
| 8' | 9 | 10' | 11 | 12' | 13 | 14' | 15 |
| 16 | 17' | 18 | 19' | 20 | 21' | 22 | 23' |
| 24' | 25 | 26' | 27 | 28' | 29 | 30' | 31 |
| 32 | 33' | 34 | 35' | 36 | 37' | 38 | 39' |
| 40' | 41 | 42' | 43 | 44' | 45 | 46' | 47 |
| 48 | 49' | 50 | 51' | 52 | 53' | 54 | 55' |
| 56' | 57 | 58' | 59 | 60' | 61 | 62' | 63 |

DISPLAY 2 (258)

| 0" | 1' | 2" | 3' | 4" | 5' | 6" | 7' |
|---|---|---|---|---|---|---|---|
| 8' | 9" | 10' | 11" | 12' | 13" | 14' | 15" |
| 16" | 17' | 18" | 19' | 20" | 21' | 22" | 23' |
| 24' | 25" | 26' | 27" | 28' | 29" | 30' | 31" |
| 32" | 33' | 34" | 35' | 36" | 37' | 38" | 39' |
| 40' | 41" | 42' | 43" | 44' | 45" | 46' | 47" |
| 48" | 49' | 50" | 51' | 52" | 53' | 54" | 55' |
| 56' | 57" | 58' | 59" | 60' | 61" | 62' | 63" |

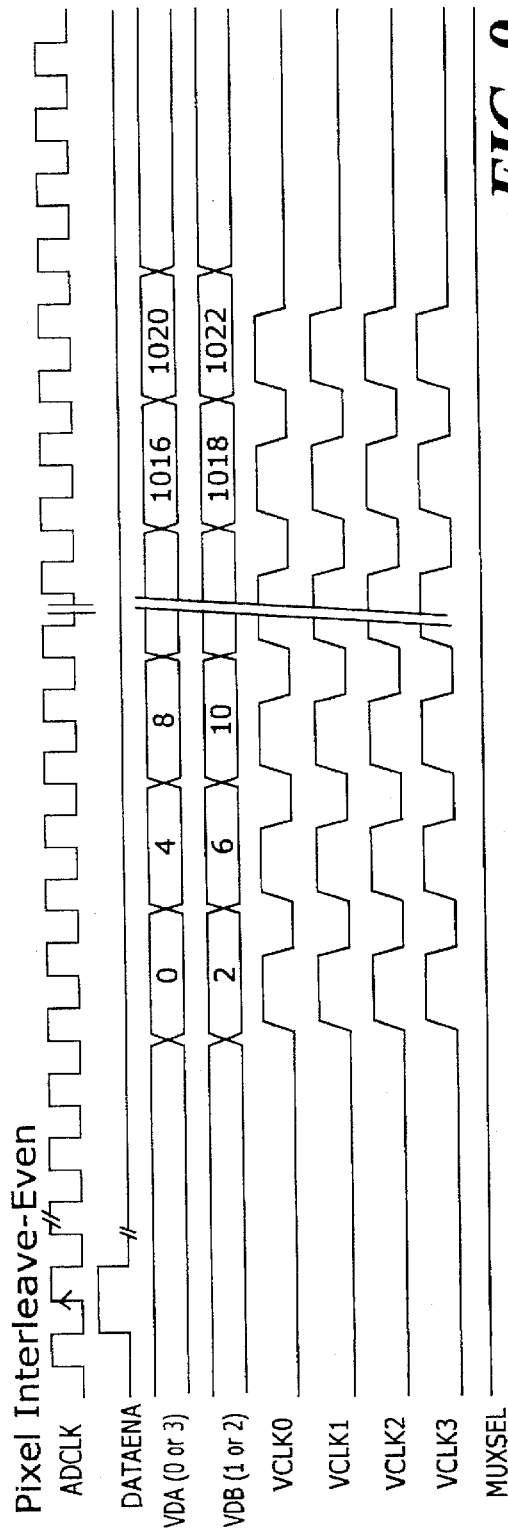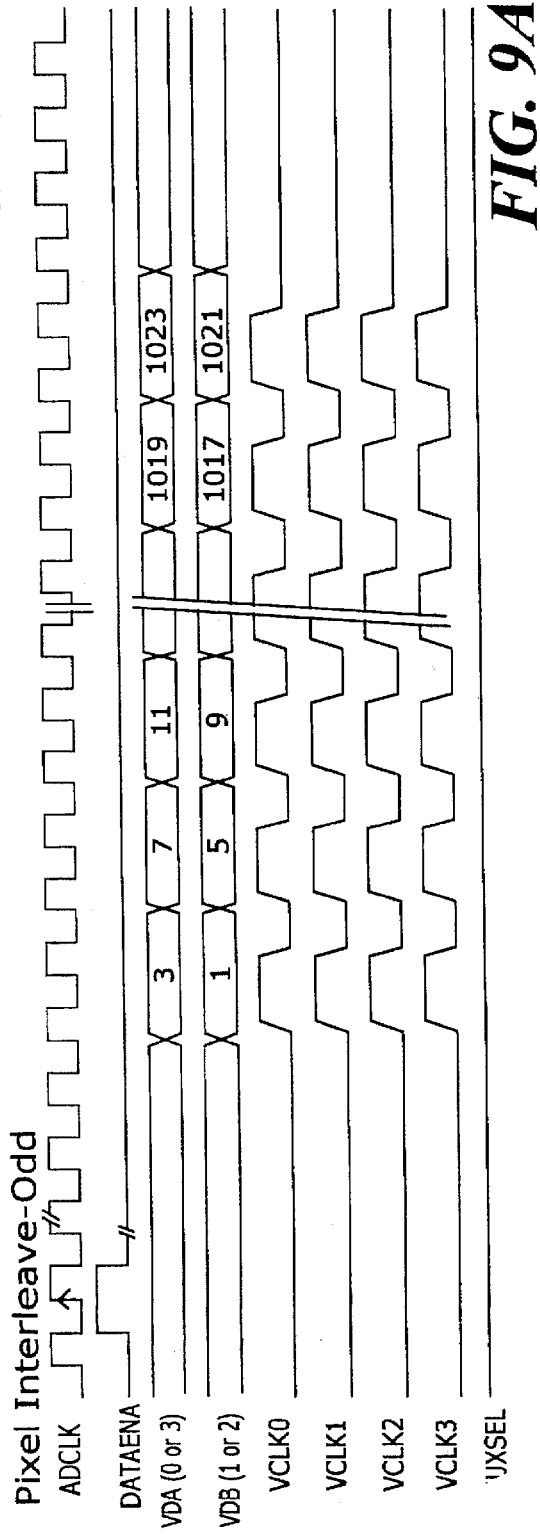

VIDEO INTERFACE SYSTEM UTILIZING REDUCED FREQUENCY VIDEO SIGNAL PROCESSING

FIELD OF THE INVENTION

This invention relates to a video interface system for processing computer or broadcast video signals for display on a flat panel display and more particularly, to a video interface system utilizing reduce frequency video signals processing.

BACKGROUND OF THE INVENTION

As is known in the field of video signal processing, a video image, or frame, is transmitted as one or more serial video signals, representing characteristics of the image, line by line and, within each line, element by element. The elements within a line are often referred to as pixels, which represent the smallest element of a display surface that can be assigned independent characteristics. Color characteristics, in the form of red, green and blue signals (i.e., referred to hereinafter as the color signals) are associated with each pixel. Synchronization information, in the form of a horizontal sync (HSYNC) signal and a vertical sync (VSYNC) signal, is also provided. The HSYNC signal specifies the end of each line of the image and the VSYNC signal specifies the end of a frame (i.e., an image associated with a single display surface). Generally, the color signals are in analog form and the VSYNC and HSYNC signals are in digital form. Various techniques, or protocols are used to transmit video signals on between one and five individual signal lines.

Video sources can be characterized as either broadcast video sources, which generate video signals of the NTSC, PAL or SECAM formats for example, or computer video sources. The resolution, pixel frequency, transmission protocol and other characteristics of the video signal are a function of the particular video source generating the signal. For example, computer generated video signals are digitized by the source, prior to being converted to analog form for transmission. Typical computer video sources have a vertical refresh rate (i.e., a rate at which an entire frame is transmitted) on the order of 30 Hz to over 75 Hz. It is generally acknowledged that real time motion can be conveyed with sequential images having a refresh rate of between approximately 24 and 30 frames/second.

Interface systems are sometimes used to process input video signals and provide output video signals compatible with a particular type of display. In video interface systems in which the display is responsive to digital signals, the analog color signals must be digitized. To this end, analog to digital converters are used to sample the analog color signals at the pixel frequency in order to sample each pixel of the signal. However, as the pixel frequencies of video signals move higher, the cost of analog to digital converters operating at such high sampling frequencies also increases.

One technique for sampling an input video signal at the pixel frequency without the use of expensive, high speed analog to digital converters is to use multiple analog to digital converters, each operating at a slower rate than the pixel frequency. However, analog to digital converters are relatively expensive and thus, increasing the number of analog to digital converters tends to increase the overall cost of the system.

SUMMARY OF THE INVENTION

In accordance with the invention, a video interface system is provided for real time processing of input video signals to provide output video signals for display. The video interface system includes a sampling unit for sampling the pixels of an input video signal to capture a first subset of the pixels associated with each frame, while discarding a second subset of the pixels associated with each frame. A display is provided for simultaneously displaying the subsets of captured pixels from two or more consecutively processed frames. More particularly, a first displayed image includes a subset of pixels from a first frame and a subset of pixels from a second frame.

The display is refreshed, or updated by replacing the subset of pixels from the first frame with a subset of pixels from a subsequently processed frame. For example, in one embodiment, a subset of pixels from a third frame replaces the subsets of pixels from the first frame on the display, so that a second displayed image includes the subset of pixels from the second and third frames. It will be appreciated that the number of subsets of pixels from respective frames which are displayed together may be varied.

In the illustrative embodiment, every two frames provides one full displayed image, with one-half of the pixels contributed by the first frame and the other half of the pixels contributed by the second frame. Stated differently, the input video signal is sampled at approximately one-half of the pixel frequency. In one embodiment, incoming video signals with pixel frequencies greater than a predetermined value, such as 67.5 MHz, are sampled at a sub-multiple of the pixel frequency as described above, whereas, video signals with pixel frequencies less than the predetermined value are sampled at the pixel frequency. Video signals with pixel frequencies greater than 67.5 MHz generally have frame refresh rates on the order of 60 Hz or greater. Since motion can be conveyed by displaying successive images at a rate on the order of 24–30 frames/second, the illustrative embodiment displays video images without sacrificing the display of motion. Moreover, by generating a displayed image from subsets of pixels from more than one frame, the sampling unit, which in one embodiment includes an analog to digital converter, can operate at a slower rate than the pixel frequency associated with the input video signal. Since the cost of analog to digital converters, and other circuitry, generally increases with increased speed of operation, this arrangement permits lower cost analog to digital converters to be used, thereby reducing the overall cost of the video interface system. Moreover, in one embodiment, the circuitry "downstream" from the sampling unit (i.e., the frame buffers and display interface unit) also operate at this slower rate, so as to further reduce the overall cost of the video interface system.

Each pixel of the input video signal has a row number and a column number which defines the position of the pixel within the respective frame. Also associated with each pixel is a pixel number corresponding to the sequential location of the pixel within the respective frame of the video signal, which is arranged as a plurality of lines containing sequentially numbered pixels.

In one embodiment, the subset of pixels captured from a first frame of an input video signal includes those pixels for which the sum of the respective row and column numbers is either odd or even and the subset of pixels captured from the second frame of the video signal includes those pixels for which the sum of the respective row and column numbers is either even or odd. This arrangement provides each subset of captured pixels with a "checkerboard" pattern, with the subset associated with the first frame representing a first "color of squares" of the checkerboard and the subset associated with the second frame representing a second color of squares of the checkerboard. It will be appreciated however, that the pattern of the pixels within the subsets of captured pixels may be readily varied.

Also provided is a frame buffer for temporarily storing the subsets of captured pixels from each of the frames of the video signal before the pixels are displayed. A display interface unit reads the pixels out of the frame buffer and transfers the pixels to the display, such as a flat panel display. In one embodiment, the frame buffer includes a plurality of Video Random Access Memory (VRAM) devices, with each VRAM storing only odd or even numbered pixels. The subset of pixels from the first frame is interleaved within the frame buffer with the subset of pixels from the second frame. The display interface unit reads the stored pixels out of the VRAMs so that the subset of pixels from the first frame is interleaved with the subset of pixels from the second frame to provide an image on the display.

BRIEF DESCRIPTION OF THE DRAWINGS

The foregoing features of this invention, as well as the invention itself, may be more fully understood from the following detailed description of the drawings in which:

FIG. 5 shows three illustrative frames of an input video signal and the displayed images;

FIG. 9 is a timing diagram illustrating pixel interleaving operation of the system of FIG. 2 in the processing of a first frame;

FIG. 9A is a timing diagram illustrating pixel interleaving operation of the system of FIG. 2 in the processing of a second frame.

DESCRIPTION OF THE PREFERRED EMBODIMENT

Figure 1:
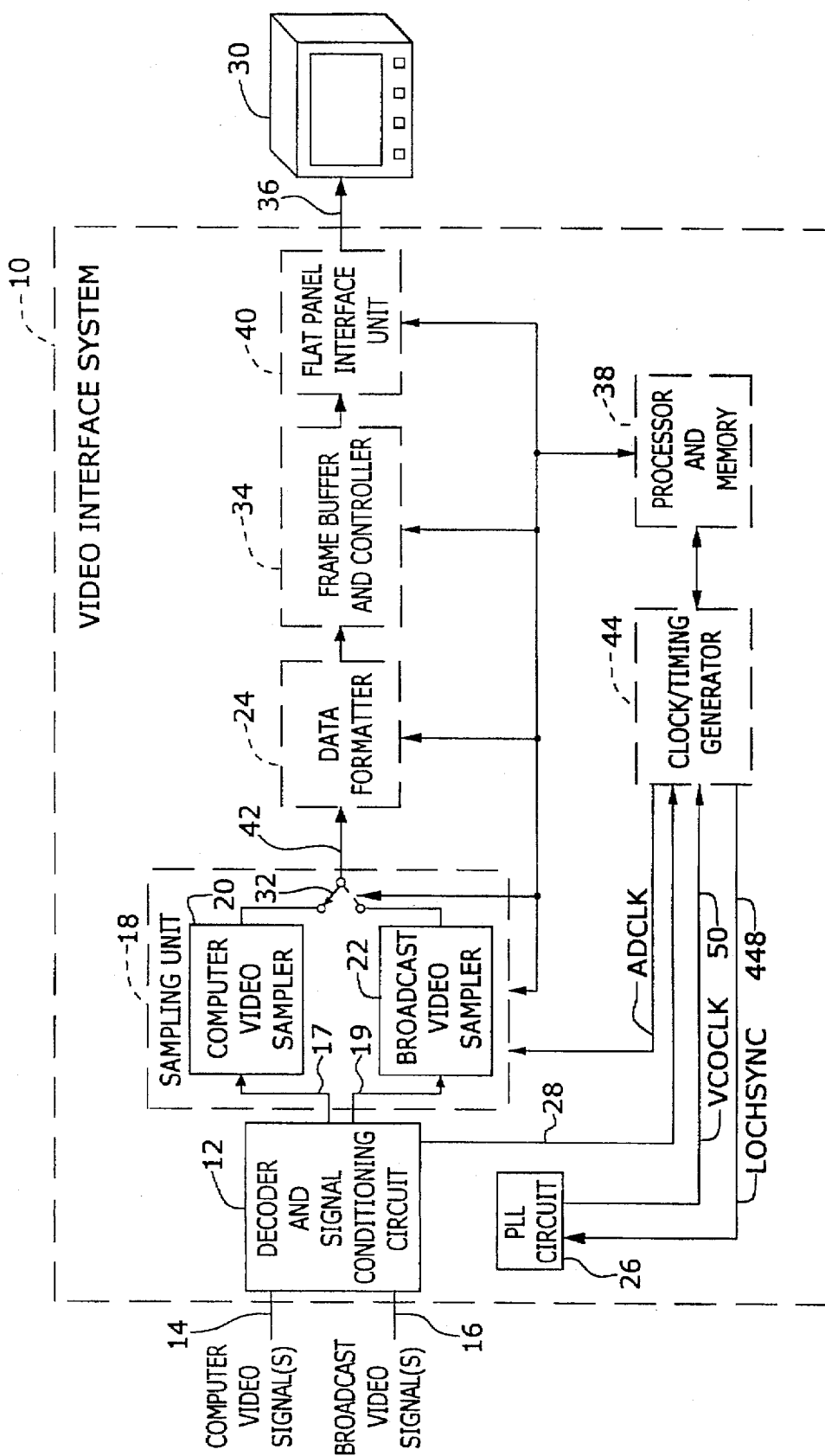
FIG. 1 is a block diagram of a video interface system in accordance with the invention.

Referring to FIG. 1, a video interface system 10 is shown for converting an input video signal 14, 16 of a first format compatible with a first type of display into an output video signal 36 of a second format compatible with a second type of display, such as a flat panel display 30. Illustrative types of flat panel displays 30 include Liquid Crystal Displays (LCDs), electroluminescent displays, and plasma displays. The interface system 10 is responsive to computer video signals 14 generated by a computer video source (not shown) and to broadcast video signals 16 generated by a broadcast video source, for example of the NTSC, SECAM or PAL format. At any given time, the system 10 may receive computer video signals 14 or broadcast video signals 16, or both, as will be described below. Although the input video signals 14, 16 are carried on between one and five individual signal lines depending on the protocol of the video source, the input signals 14, 16 are referred to hereinafter in the singular for simplicity.

The video interface system 10 includes a decoder and signal conditioning circuit 12 for optionally decoding and/or conditioning the input video signal 14, 16. In processing video signals in which the SYNC signals are encoded with one or more of the color signals, the decoder 12 serves to separate the SYNC signals from the color signals. The SYNC signals are coupled to a clock/timing generator 44 via signal line 28. Also, in processing a video signal 16 from a broadcast video source, SECAM, PAL or NTSC decoders may be used to extract the SYNC and/or color information. However, in some cases, decoding the input video signal 14, 16 is not necessary. For example, where the input video signal 14, 16 is a five wire signal, the red, green and blue color signals, as well as the HSYNC and VSYNC signals, are provided on separate signal lines. The color signals may be conditioned by variable gain amplifiers within the conditioning circuit 12.

A PLL circuit 26 is responsive to a LOCHSYNC signal on line 448 for generating a VCOCLK signal 50 which is phase-locked to the input video signal 14, 16 and has a frequency which is equal to, or a multiple of the pixel frequency of the input signal. In the present embodiment, the PLL circuit 26 is operable to track frequencies between approximately 67.5 MHz and 135 MHz. If the pixel frequency of the input video signal 14, 16 is within this range, the frequency of the VCOCLK signal 50 is matched to the frequency of the input video signal; whereas, if the frequency of the input video signal is less than 67.5 MHz, then the frequency of the VCOCLK signal 50 is a multiple of the frequency of the input video signal.

The output signals 17, 19 of the decoder and signal conditioning circuit 12 contain the color information about each pixel of the input video signal and are coupled to a sampling unit 18 containing samplers 20 and 22. In the illustrative embodiment, the sampling unit 18 contains digitizers 20 and 22, such as analog to digital converters. The digitizers convert the analog color signals into digital signals and include a computer video digitizer 20 responsive to computer video color signals 17 and a broadcast video digitizer 22 responsive to broadcast video color signals 19. It will be appreciated however that the sampling unit 18 may alternatively be responsive to digitized signals 17, 19 for sampling such digitized signals.

The outputs of digitizers 20 and 22 are coupled to a switch 32 which is controlled by a processor and memory unit 38. In some situations, both a computer video signal 14 and a broadcast video signal 16 are simultaneously coupled to the system 10. In this case, a user is permitted to pre-program a selection of one type of signal for processing and display and the switch 32 is positioned in accordance with the user's preference of computer video signal or broadcast video signal as stored in memory 38.

Computer video signals 14 have been previously digitized at the video source and thus, can be considered to have a characteristic frequency associated therewith corresponding to the frequency of the original digitized signal (i.e., the pixel frequency). Each period of the input video signal 14, 16 corresponds to one element, or pixel, within a line of a frame represented thereby. Illustrative characteristic frequencies associated with computer video signals 14 are between approximately 32.5 MHz to 135 MHz. Broadcast video signals 16 on the other hand generally have characteristic frequencies on the order of approximately 15 MHz.

Each pixel of an input video signal has a row and column number associated therewith, corresponding to the row/column position of the pixel within the respective frame of the video signal. Also associated with each pixel is a pixel number corresponding to the location of the pixel within the respective video image, which is arranged as a plurality of sequential lines containing sequentially numbered pixels.

The digitizers 20, 22 operate to sample the respective video signal 17, 19 at a rate set by an ADCLK signal generated by the clock/timing generator 44. The ADCLK signal has a frequency equal to one-half the frequency of the VCOCLK signal. The output of switch 32 provides a digitized signal 42 which corresponds to samples of pixels of the input video signal 14, 16. In one embodiment, the digitized signal 42 is a twenty-one bit signal, with seven bits providing red pixel data, seven bits providing blue pixel data and seven bits providing green pixel data.

Depending on the pixel frequency of the input video signal 14, 16, the digitizers 18 may sample the incoming video signal at a frequency less than the pixel frequency in accordance with a "pixel interleaving" mode of operation described in detail below. During pixel interleaving operation, the input video signal is sampled at some sub-multiple of the pixel frequency. This is because analog to digital converters which sample at relatively high frequencies are expensive, thereby disadvantageously increasing the cost of the interface system. In accordance with pixel interleaving operation, if the pixel frequency associated with the input video signal is greater than a predetermined frequency, then the digitizers 18 sample the incoming signal at a sub-multiple of the video signal frequency. Moreover, the remainder of the video signal processing circuitry which operates on the digitized signal 42 to provide the digital output signal 36 also operates at this sub-multiple frequency, in order to further reduce the overall cost of the video interface system 10.

In one embodiment, input video signals with a pixel frequency between approximately 32.5 MHz and 67.5 MHz are sampled at the pixel frequency in accordance with non-pixel interleaving operation; whereas, video signals with pixel frequencies between approximately 67.5 MHz and 135 MHz are sampled at a sub-multiple of the pixel frequency in accordance with pixel interleaving operation. Since broadcast video signals 16 generally have pixel frequencies on the order of 15 MHz, pixel interleaving operation is not performed on such signals. Rather, broadcast video signals 16 are sampled at the pixel frequency.

The digitized signal 42 is coupled to a data formatter 24 which, in some applications, further samples the digitized signal 42. More particularly, since, in the illustrative embodiment, the PLL circuit 26 can track frequencies only down to 67.5 MHz, in situations in which the pixel frequency of the input video signal is relatively low, the ADCLK signal will have a frequency greater than the pixel frequency. In these cases, there is no need to sample the input video signal 14, 16 during every cycle of the ADCLK signal, as is achieved by the digitizers 18. Rather, the digitized signal 42 is sampled at some sub-multiple of the ADCLK signal by the data formatter 24.

Also provided in the data formatter 24 is a dithering circuit (FIG. 2) which implements an interpolation process on the bits of each pixel of the digitized signal 42. The dithering circuit spatially approximates each seven bit color signal of the digitized signal 42 to provide a five bit color signal. Thus, the output of the dithering circuit is a fifteen pixel signal, with five bits representing each color component of the pixel.

In some applications, the digitized video signal 42 must be scaled (i.e., its resolution converted) so that an incoming frame can fit on the screen of the flat panel display 30. That is, the resolution of the input video signal 14, 16 may be different from the resolution associated with the flat panel display 30. In the illustrative embodiment, the resolution of the flat panel display 30 is 1024×768 pixels. Illustrative computer video source resolutions are 800×600, 640×480, 1024×768, 1280×1024, and 1152×900. Thus, in the latter two cases, each incoming video frame must be reduced in both number of lines and number of pixels/line. The line and pixel/line scaling of the incoming video signal is performed by the data formatter 24.

In accordance with one embodiment, where the input video signal has a resolution of 1280×1024, one out of every four lines and one out of every four pixels/line are discarded, to provide an effective input resolution of 960×768 which is compatible with the 1024×768 resolution of the flat panel display 30. Similarly, in one embodiment where the input video signal resolution is 1152×900, one out of every six lines and one out of every six pixels/line are discarded, to provide an effective input resolution of 960×750 which is compatible with the 1024×768 resolution of the flat panel display 30. It will be appreciated by those of skill in the art however that various techniques may be used to scale the resolution of the input video signal in order to render the resolution of the incoming signal compatible with the resolution of the display. For example, lines may be "dropped" by combining pixels from more than one line into a single composite line. Since most conventional broadcast video sources transmit frames containing 475 or 575 lines and 910 pixels/line, neither scaling down of the number of lines of a frame nor the number of pixels/line is generally necessary for a flat panel display with a 1024×768 resolution.

The data formatter 24 forwards the data thus processed to a frame buffer and controller 34 which temporarily stores the pixels of the digitized signal 42. Pixels are read out of the frame buffer and controller 34 under the control of a display interface unit 40 and the controller portion of the frame buffer and controller 34, as will be described in greater detail in conjunction with FIG. 2 below. The clock/timing generator 44 generates several clock signals and other signals, for use throughout the system 10. The processor and memory 38 controls various aspects of the video interface system 10, including the flat panel interface unit 40, the data formatter 34, the frame buffer and controller 24, and the clock/timing generator 44, as will be described in conjunction with FIG. 2.

Figure 2:
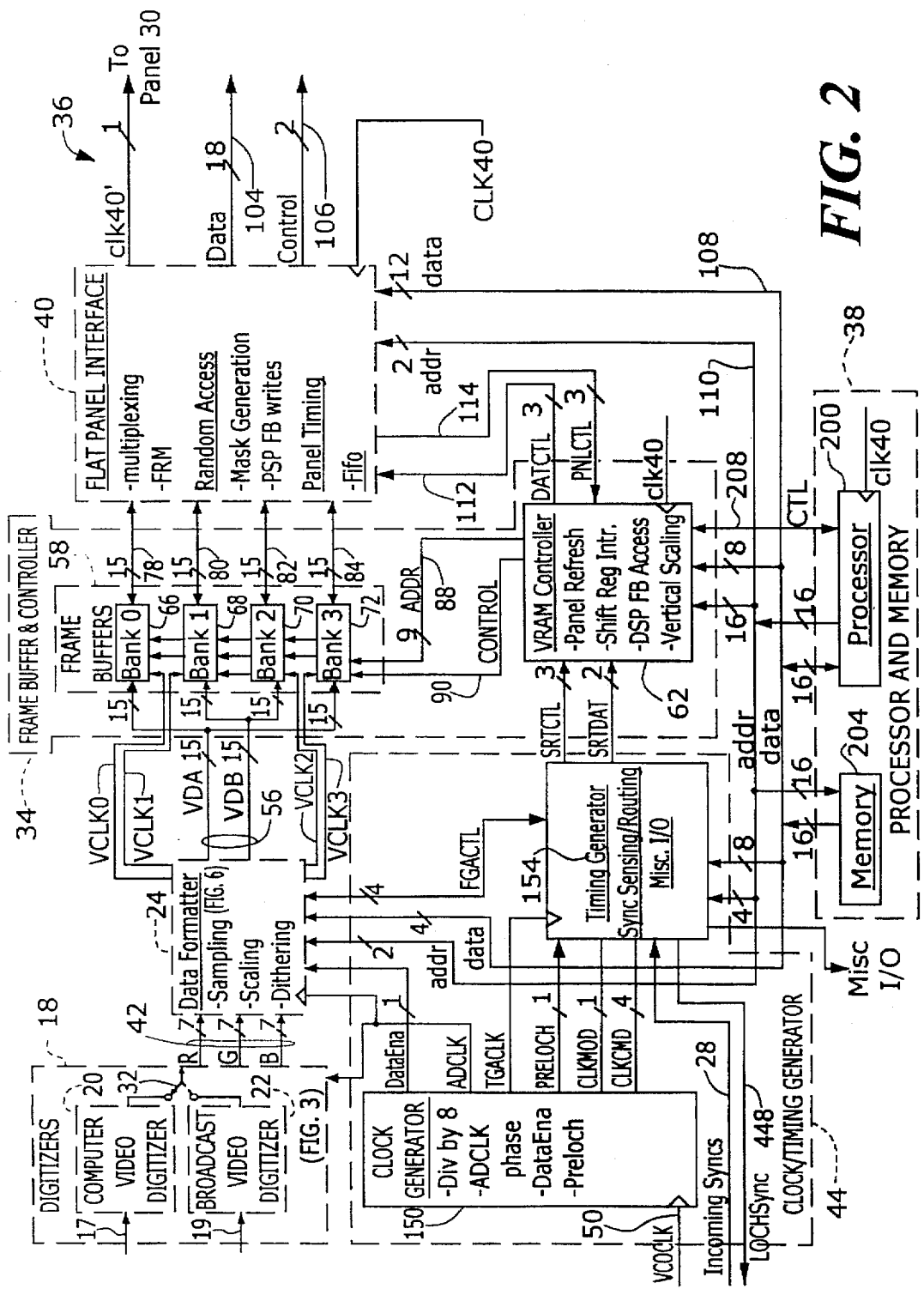
FIG. 2 is a more detailed block diagram of the video interface system of FIG. 1.

Referring also to FIG. 2, the video interface system 10 is shown in greater detail, without the decoder and signal conditioning circuit 12 and the PLL circuit 26 for simplicity. The digitizers 18 provide a twenty-one bit output signal 42, consisting of seven bits of red data, seven bits of green data and seven bits of blue data, to the data formatter 24. As noted above, the data formatter 24 implements resolution scaling and dithering features. Additionally, the data formatter 24 may further sample the digitized signal 42 in applications in which the ADCLK signal has a frequency greater than the pixel frequency of the input video signal 14, 16.

In the illustrative embodiment, the output bus 56 of the data formatter 24 is wider than the input bus 42, in order to avoid exceeding the bandwidth of frame buffers 58 within the frame buffer and controller 34. More particularly, in applications in which pixel frequency of the input computer video signal 14 is on the order of 135 MHz, the computer video digitizer 20 will sample at approximately 67.5 MHz. Since the illustrative frame buffers 58 cannot accept serial data that fast, a mismatch occurs. To overcome this mismatch, the output data bus 56 of the data formatter 24 is made wider than the input data bus 42. To this end, the output data bus 56 includes two fifteen bit buses VDA and VDB, as shown. Since the dithering circuit within the data formatter 24 (FIG. 6) approximates the seven bit pixel color signals with corresponding five bit signals, the output data bus 56 is twice as wide as the fifteen bit data bus at the output of the dithering circuit. The data formatter 24 additionally provides clock signals VCLK0, VCLK1, VCLK2 and VCLK3 to the frame buffer and controller 34 for controlling the rate at which data from the bus 56 is clocked into the frame buffers 58.

The frame buffer and controller 34 includes a frame buffer 58, comprising a plurality of VRAM devices, and a VRAM controller 62. In the illustrative embodiment, the frame buffers 58 include eight VRAM devices, with each pair of VRAMs comprising a memory bank, labelled Bank0 66, Bank1 68, Bank2 70 and Bank3 72. Bank0 66 and Bank3 72 each receive data from the VDA bus and Bank1 68 and Bank2 70 each receive data from the VDB bus. Each of the memory banks 66–72 has 256K addressable locations, with each addressable location spanning the two VRAMs of the respective pair to accommodate the depth of the stored pixels. While three such banks would provide the requisite total storage space to store the 1024×768 pixels associated with a frame displayed on the flat panel display 30, other factors dictate the choice of four banks, such as read out bandwidth. It will be appreciated however, that the particular number, as well as the structural and logical arrangement of the VRAMs comprising the memory banks 66–72, may be readily modified for a given application as is necessary to accommodate varying amounts of stored pixels and other design considerations.

Each of the memory banks Bank0 66, Bank1 68, Bank2 70 and Bank3 72 receives a clock signal VCLK0, VCLK1, VCLK2 and VCLK3, respectively, from the data formatter 24 and provides a fifteen bit output signal 78, 80, 82 and 84, respectively, to the flat panel interface unit 40. In one embodiment, each of the VRAM devices is an NEC 482235 device.

The VRAM controller 62 controls the memory banks 66–72 via an address bus 88 and a control bus 90. More particularly, the VRAM controller 62 is responsive to a three bit PNLCTL signal 114 from the flat panel interface unit 40 for causing the flat panel display 30 to be refreshed. In one embodiment, the PNLCTL signal instructs the controller 62 whether or not to start fetching pixels from the frame buffer 58 for forwarding to a FIFO within the flat panel interface unit 40 and whether or not to reset a user interface control panel feature on the display 30. In response to a command to start fetching pixels, the VRAM controller 62 controls the fetching process by sending the addresses of the pixels to be fetched to the frame buffers 58 via the address bus 88 and by sending a read out command to the frame buffer 58 via control bus 90. The VRAM controller 62 also transmits a three bit signal DATCTL signal 112 to the flat panel interface unit 40 to instruct the interface unit when to read data out of the frame buffer 58.

The VRAM controller 62 also controls a shift register interrupt feature. In the illustrative embodiment, each of the VRAMs comprising the frame buffers 58 includes a shift register from which a 512 bit serial stream is simultaneously transferred into the dynamic memory portion of the device. This transferring, or shifting function is performed at predetermined time intervals, when the shift registers are full. The clock/timing generator 44 generates control signals via a three bit SRTCTL signal to command the VRAM controller 62 to interrupt any writing to, or reading from, the frame buffers 58 in order to permit the contents of the VRAM shift registers to be shifted into the dynamic portion of the VRAMs. Thus, a panel refresh operation may be temporarily interrupted in order to transfer the contents of the VRAM shift registers into dynamic memory. A nine bit SRTDAT signal is also provided by the timing/clock generator 44 to the VRAM controller 52 and contains the address for the row of the dynamic portion of the VRAM into which the shift register contents are to be transferred.

In the illustrative embodiment, a processor 200 of the processor and memory unit 38 writes the user interface control panel into the frame buffers 58 in accordance with information stored in memory 204. The VRAM controller 62 controls the processor's access into the frame buffers 58 by sending the appropriate address and control information to the frame buffers via buses 88 and 90. The actual data to be written by the processor 200 to the frame buffers 58 is routed through the flat panel interface unit 40 via data bus 108 and address bus 110. To this end, the VRAM controller 62 transmits the DATCTL signal to the flat panel interface unit 40 to instruct the interface unit 40 when to write the data to the frame buffers 58.

Scaling the resolution of the incoming video signal 14, 16 by expanding the number of lines in the frame (i.e., vertical expansion) is performed by the VRAM controller 62. More particularly, in some applications in which an incoming video frame has fewer lines than the 768 lines associated with the flat panel display 30, the VRAM controller 62 performs a process of expanding the number of input lines to fill up an entire screen of the flat panel display 30. In one embodiment, vertical expansion is achieved by repeating each line of the input video signal a predetermined number of times to provide the output video signal 36. However, it will be appreciated that various techniques may be used to achieve vertical expansion scaling.

The flat panel interface unit 40 performs frame rate modulation (FRM) on the pixels stored in the memory banks 66–72, which causes the five bit pixel color signals to be further approximated by three bit signals. FRM varies from the dithering process used by the data formatter 24 to convert the seven bit pixel color signals into five bit pixel color signals in that FRM approximates the signal over time, whereas dithering implements a spatial approximation technique. The flat panel interface 40 includes a FIFO for temporarily storing the frame rate modulated pixels. A multiplexer multiplexes the pixels stored in the FIFO to provide the pixels for subsequent transfer to the flat panel display.

The flat panel interface unit 40 additionally serves to provide random access to the memory banks 66–72 for purposes of writing data from the processor 200 to the frame buffers 58, as discussed above, and also to implement mask generation. Mask generation is a process whereby certain ones of the VRAMs are not loaded with the data in the respective serial shift register in accordance with masks. For example, and as will become more apparent by reference to FIG. 6 below, when the system 10 is operating in the pixel interleaving mode, stored pixels are simultaneously written into two of the four memory banks 66–72. In this case, the VRAMs of the other two banks are "masked", so that the data which has been clocked in from the respective input bus VDA, VDB into the serial shift register of the respective VRAM under the control of the VCLK0–VCLK3 signals is not transferred into the dynamic memory portion of the VRAM.

The flat panel interface unit 40 controls the timing of the display refreshes. To this end, the interface unit 40 includes free-running clock circuitry responsive to a CLK40 signal generated by a crystal coupled to the processor 200 and, in the illustrative embodiment, having a frequency of 40 ns. The interface unit 40 provides a CLK40' signal to the display 30. The panel timing circuitry within the flat panel interface unit 40 additionally creates HSYNC and VSYNC signals for the display and forwards such control information to the display via a control bus 106. As noted above, the interface unit 40 contains a FIFO which stores pixels which are read out of the frame buffers 58. In one embodiment, the FIFO can store sixty-four pixels. The pixels from the FIFO are transferred to the flat panel display 30 via a data bus 104. The output video signal 36 includes the CLK40' signal, the control bus 106 and data bus 104.

The clock/timing generator 44 is responsive to the VCO-CLK signal 50 and to the SYNC signals 28 for generating a plurality of clock and other timing signals for use various components of the video interface system 10, as will be discussed further in conjunction with FIGS. 10–11 below. The clock/timing generator 44 includes a clock generator 150 and a timing generator 154. The clock generator 150 is responsive to the VCOCLK signal 50 for generating the ADCLK signal, a TGACLK signal, an internal clkdv2 signal, and a PRELOCH signal. The timing generator 154 receives the TGACLK signal and the PRELOCH signal from the clock generator 150 and the SYNC signals 28 and generates CLKMOD and CLKCMD signals for use by the clock generator 150, as will be described. The timing generator 154 additionally conditions the PRELOCH signal to provide a LOCHSYNC signal 448 for coupling to the PLL circuit 26. The LOCHSYNC signal 448 is used by the PLL circuit 26 to track the HSYNC information from the incoming video signal in order to generate the VCOCLK signal.

The processor and memory unit 38 includes processor 200 and memory 204, both of which are in electrical communication with the data bus 108 and address bus 110, as shown. Additionally, the processor 200 sends and receives control signals 208 to and from the VRAM controller 62 informing the controller that access to the frame buffer 58 is desired. In one embodiment, the memory 204 is a non-volatile memory. In the illustrative embodiment, the data formatter 24, the clock/timing generator 44, the VRAM controller 62 and the flat panel interface unit 40 are implemented on four individual field programmable gate arrays (FPGAs), with the code for each of the FPGAs being stored in the flash memory 204.

Figure 3:
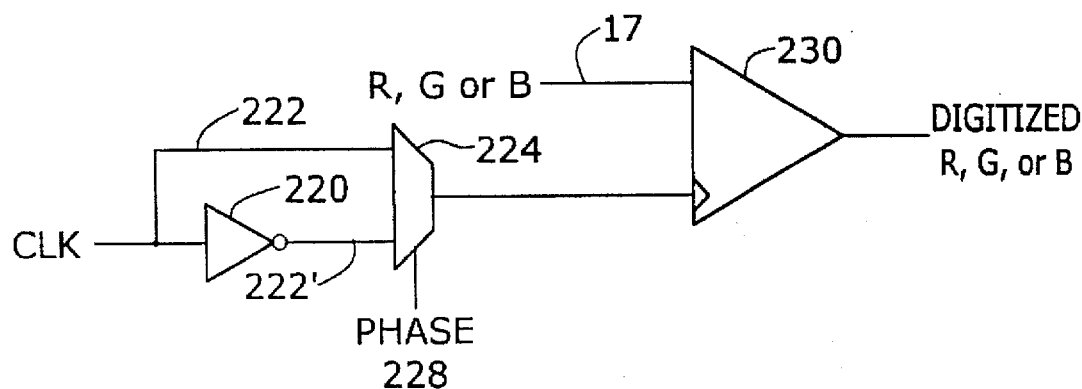
FIG. 3 is a simplified schematic of an analog to digital converter of FIG. 2.

Referring also to FIG. 3, a simplified schematic of one analog to digital converter of the digitizers 18 is shown to include an inverter 220 responsive to a CLK signal 222. The CLK signal 222 is additionally coupled to a first input of a 2:1 multiplexer 224, the second input to which is connected to the output signal 222' of the inverter 220. The multiplexer 224 is controlled by a PHASE signal 228 and provides a clock signal at an output terminal thereof to an analog to digital converter 230. Also coupled to the analog to digital converter 230 is one of the red, green and blue signals 17 within digitized signal 42. It will be appreciated that the data formatter 24 includes three circuits identical to the circuit shown in FIG. 3, to process the others of the red, green and blue signals.

In operation, when an input video signal is sampled at its pixel frequency (i.e., during non-pixel interleaving operation), the PHASE signal 228 remains in a single state, to select the CLK signal 222 for providing the clock signal for the analog to digital converter 230. With this arrangement, the red, green or blue signal on line 16 is sampled on each rising edge of the CLK signal 222.

During pixel interleaving operation, the frequency of the ADCLK signal is a sub-multiple, or fraction of the pixel frequency. For example, when the pixel frequency is 135 MHz, the CLK signal 222 has a frequency of 67.5 MHz. During pixel interleaving operation, the PHASE signal toggles at the end of each line of the input video signal (i.e., at the occurrence of the HSYNC pulses) to select either the CLK on signal line 222 or the inverted version thereof on signal line 222' for coupling to the analog to digital converter 230. With this arrangement, a first line of video data is sampled on the rising edge of the 67.5 MHz CLK signal 222 and the second line of video data is sampled on the rising edge of the inverted version of the CLK signal 222'.

In the interface system 10 described herein and as will become apparent by reference to FIG. 10 below, the CLK signal 222 and the inverted version 222' of the CLK signal are provided by the ADCLK signal (FIGS. 1 and 2). That is, the clock generator 150 generates the ADCLK signal to have a first transition polarity during the interval when a first line of an incoming frame is processed and to have a second, opposite transition polarity during the interval when a second line of the frame is processed and to toggle back and forth between transition polarities as subsequent lines of the frame are processed.

Figure 4:
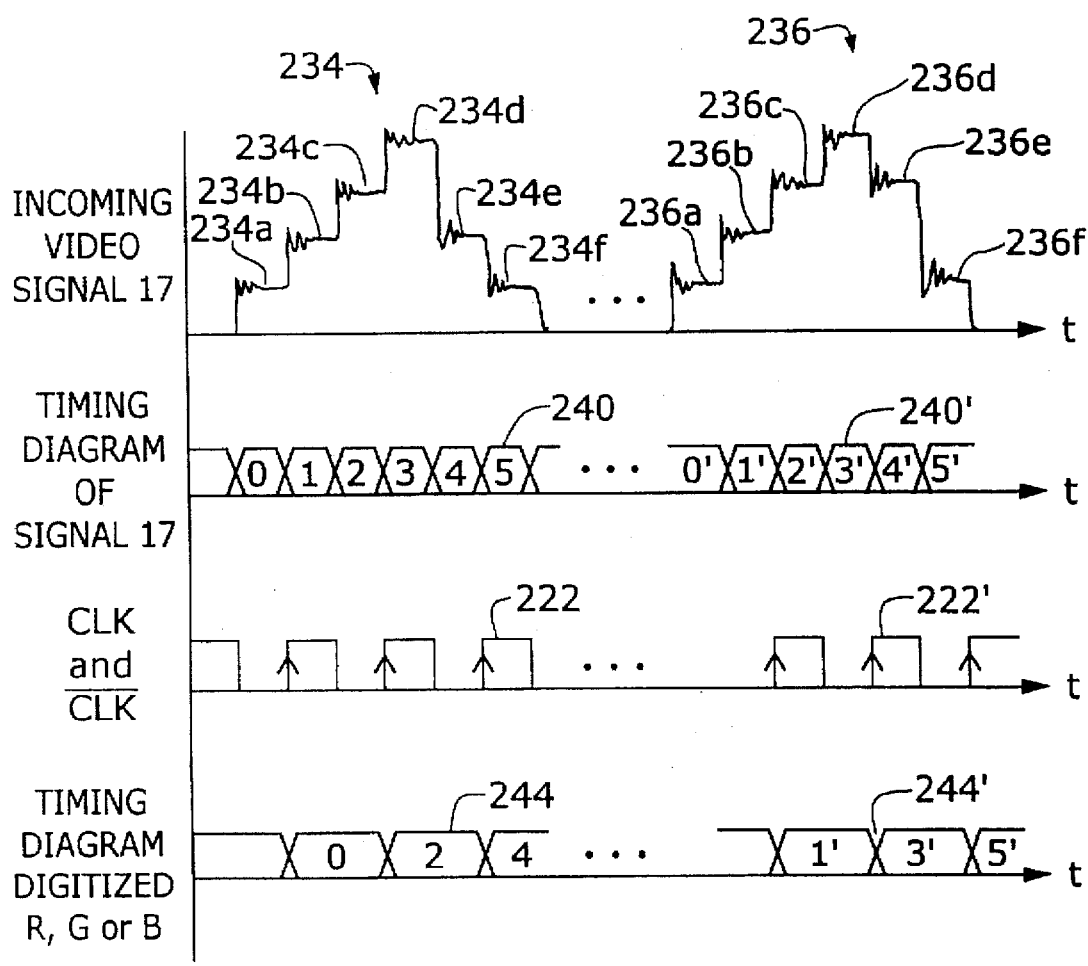
FIG. 4 shows two illustrative frames of an input video signal, the pixel timing, a sample clock signal and the timing of the pixels samples captured by the analog to digital converter of FIG. 3.

The operation of the circuit of FIG. 3 during the pixel interleaving mode of operation will become more apparent by referring to FIG. 4, in which two lines 234, 236 of an incoming video signal 17 are shown. Also shown are the timing diagrams 240, 240' of the input video signal 17. In the illustrative example, the video signal 17 has a pixel frequency of 135 MHz. In this case, the ADCLK signal has a frequency of one-half of the pixel frequency or 67.5 MHz.

The CLK signal 222 controls the analog to digital converters when the first line 234 of the signal 17 is processed and the inverted version of the CLK signal 222' controls the analog to digital converters when the second line 236 of the signal 17 is processed. With this arrangement, for a given line of video information, only every other pixel is sampled. For example, where line 234 is sampled on each rising edge of the CLK signal 222 the video signal is sampled at every other digitized level 234a, 234c, 234e, etc. Stated differently, the even pixels are sampled on the first line 234 of the video frame.

The portion 236 of the video signal 17 corresponding to the next line of the frame, having digitized levels 236a–236f is sampled by the inverted version of the CLK signal 222'. Thus, on the second line, the other ones of every other pixel of the video signal 17 are sampled. That is, on the second line of the video frame, samples 236b, 236d, 236f etc. are captured. Stated differently, the odd pixels are sampled on the second line 236 of the video frame.

Since each analog to digital converter 230 of the digitizers 18 samples the incoming video signal 17 on the rising edges of the CLK signal 222 (or alternatively on the rising edges of the inverted version of the CLK signal 222'), such samples occur at a frequency of 67.5 MHz. The timing diagram of the digitized red, green or blue signal samples associated with the first line 234 of signal 17 is labelled 244 in FIG. 4 and has a frequency of 67.5 MHz. Similarly, the timing diagram of the digitized red, green or blue signal samples associated with the second line 236 of signal 17 is labelled 244' in FIG. 4. Note that only even pixels are sampled on the first line 234 of the processed frame whereas only odd pixels are sampled on the second line 236 of the frame.

Referring also to FIG. 5, the effect of sampling every other pixel of an incoming video signal on the display 30 is shown. First, second and third illustrative incoming video frames 250, 252 and 254 are shown to have pixels numbered 0–63, 0'–63' and 0"–63", respectively. Also shown in FIG. 5 are the frames 256 and 258 displayed on the flat panel display 30 as a result of processing the incoming sequential frames 250, 252 and 254 by the pixel interleaving method, with displayed pixels numbered in accordance with the pixel numbers of the respective video frames 250, 252 and 254.

By processing an incoming video signal 17 in the pixel interleaving manner described above, only a subset of pixels from each of the sequential frames 250, 252 and 254 is sampled, or captured. The remaining, non-sampled pixels from each frame 250, 252, 254 are discarded (i.e., not captured). The subset of pixel samples from pairs of consecutive frames are displayed together on the flat panel display 30. For example, a subset of pixel samples from frame 250 is displayed with a subset of pixel samples from frame 252 and the subset of pixel samples form frame 252 is thereafter displayed with a subset of pixel samples from frame 254.

In one embodiment, the subset of captured pixels from the first frame 250 corresponds to those pixels for which the sum of the respective row and column numbers is a selected one of even and odd. The subsequent frame 252 will then be processed to capture a subset of pixels for which the sum of the respective row and column numbers is the other one of even and odd. In the illustrated example, the subset of pixels captured from the first frame 250 are those for which the sum of the respective row and column numbers is even and the subset of pixels captured from the second frame 252 are those for which the sum of the respective row and column numbers is odd.

More particularly, where the rows of each frame are numbered $n=1$ to $n=X$, and the columns of each frame are numbered $m=1$ to $m=Y$ (as shown for the first frame 250 with $X=8$ and $Y=8$), the captured pixels from the first frame 250 correspond to those pixels for which $n+m=$even. Conversely, the captured pixels from the second frame 252 correspond to those pixels for which $n+m=$odd. With this arrangement, the subset of pixels sampled in a given frame alternates from even numbered pixels on one line to odd numbered pixels on the next line, etc. For example, the pixels captured from the first line $n=1$ of the first frame 250 are pixels 0, 2, 4 and 6, the pixels captured from the second line $n=2$ of the first frame 250 are pixels 9, 11, 13 and 15 and the pixels captured form the third line $n=3$ of the first frame 250 are pixels 16, 18, 20 and 22, etc. This "toggling" of the even and odd numbered pixels on each line is achieved by the PHASE signal 228 which controls the multiplexer 224 of each analog to digital converter 230 (FIG. 3). The subset of sampled pixels from each frame can be characterized as a "checkerboard" pattern containing squares of only one color (i.e., black or red).

As noted above, the second frame 252 is processed in the same way as the first frame 250, except that pixels with the opposite one of $n+m=$odd and $n+m=$even with respect to the previously processed frame are captured. That is, if the subset of pixels captured from the first frame 250 correspond to those pixels for which $n+m=$even, then the subset of pixels captured from the second frame 252 correspond to those pixels for which $n+m=$odd. With this arrangement, the subset of pixels captured from the second frame 252 provide a checkerboard pattern of the color opposite to the color represented by the subset from the first frame 250. That is, if the subset of pixels captured from the first frame 250 correspond to the "red squares" of a checkerboard, the subset of pixels captured from the second frame 252 correspond to the "black squares" of the checkerboard.

The subsets of captured pixels from the first and second frames 250 and 252 are interleaved and displayed together by display 30 to provide a first displayed frame, or image 256. Subsequent frames, such as the third illustrated frame 254, are processed in the same manner as the preceding frames 250 and 252, so as to capture a subset of pixels which are the opposite of $n+m=$even and $n+m=$odd as compared to the just preceding frame 252. Thus, since the subset of pixels captured from the second frame 252 correspond to those pixels for which $n+m=$odd in the illustrated example, the subset of pixels captured from the third frame 254 correspond to those pixels for which $n+m=$even.

Once the subset of pixels is captured from the third frame 254, the display is updated, or refreshed to provide a second displayed frame, or image 258, with the subsets of captured pixels from the second and third frames 252 and 254 being displayed in interleaved fashion. That is, the subset of captured pixels from the first frame 250 is replaced on the display 30 by the subset of pixels captured from the third frame 254.

As should now be apparent, for every two frames of an input video signal, a single full frame is displayed. Stated differently, the input video signal is sampled at one-half the pixel frequency to capture half of the pixels associated with each frame. As noted above, pixel interleaving operation as described above is performed on incoming video signals with pixel frequencies greater than 67.5 MHz, whereas, video signals with pixel frequencies less than the predetermined value are sampled at the pixel frequency. Since video signals with pixel frequencies greater than 67.5 MHz generally have frame refresh rates on the order of 60 Hz or greater and motion can be conveyed by displaying successive images at a rate on the order of 24–30 frames/second, the illustrative embodiment displays video images without sacrificing the display of motion. Moreover, with this arrangement, the video interface system 10 is able to use less expensive analog to digital converters than would otherwise be permissible in a system capable of converting video signals with relatively high pixel frequencies. That is, although the video signal 17 may have a pixel frequency of up to approximately 135 MHz, the analog to digital converters need only operate up to a rate of 67.5 MHz. Furthermore, the circuitry "downstream" of the digitizers 18, such as the frame buffers 58, also operates at this lower frequency in the present system, thereby further simplifying the system and reducing its cost.

It will be appreciated by those of skill in the art that various schemes for sampling less than all of the pixels from each frame of the incoming video signal (i.e., for sampling the incoming video signal at a frequency less than its pixel frequency) are possible. For example, while the pixel interleaving scheme described thus far displays subsets of pixels from two incoming frames in a single displayed frame, subsets of pixels from more than two frames may alternatively provide in a single displayed frame. Moreover, the "checkerboard" pattern associated with the subsets of sampled pixels from an incoming frame may be readily modified to provide the subset of pixels in some other pattern.

Figure 6:
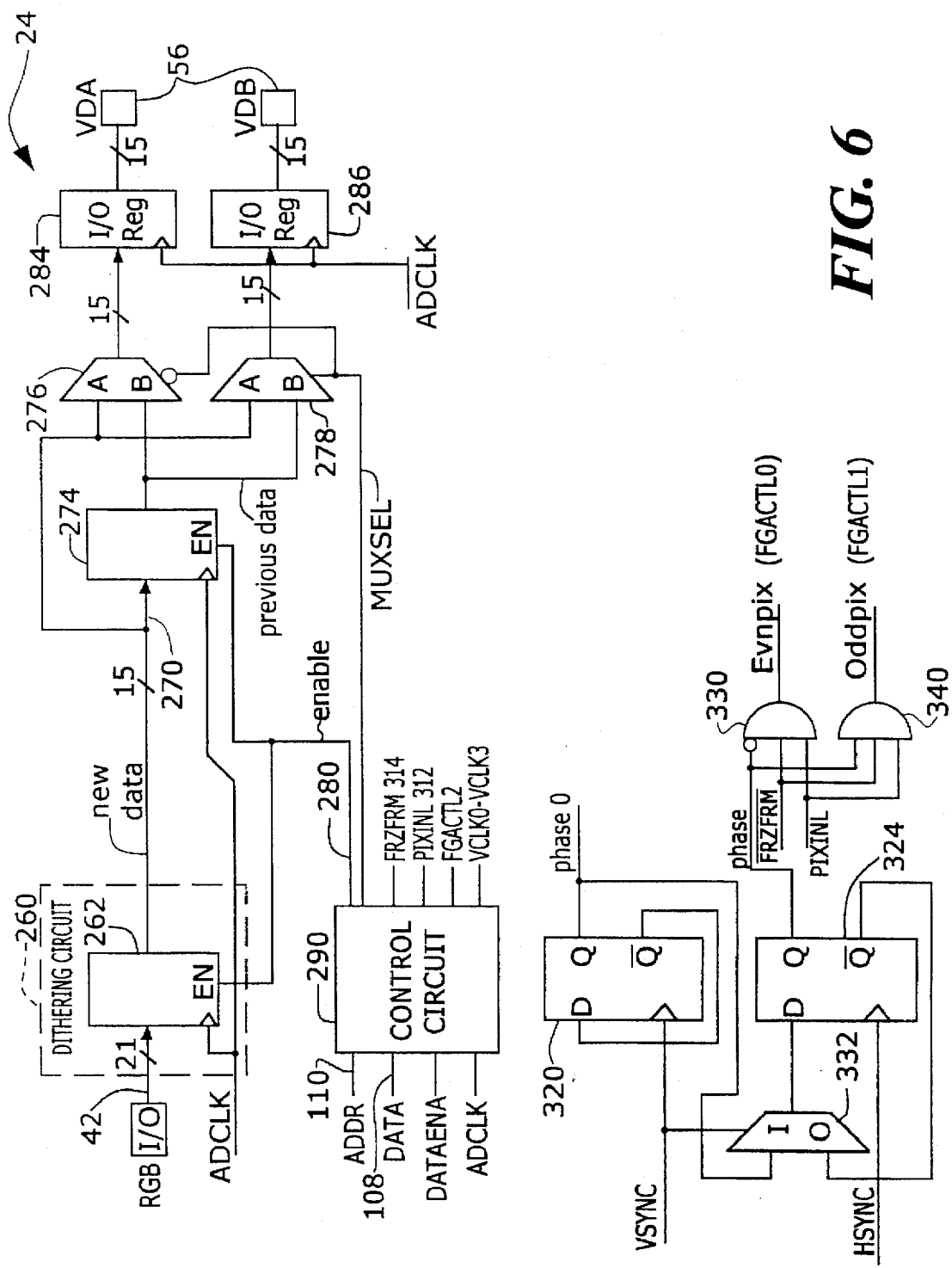
FIG. 6 is a schematic of the data formatter of FIG. 2.

Referring also to FIG. 6, a schematic of the data formatter 24 is shown to include a dithering circuit 260, including a flip-flop 262. The dithering circuit spatially approximates the incoming seven bit color signals 42 into five bit signals.

Flip-flop 262 is clocked by the ADCLK signal, as shown. The output of the dithering circuit 260 is a fifteen bit signal 270 corresponding to the five bit approximated red, blue and green signals of the presently processed pixel, which carries "new" data.

The fifteen bit output signal 270 of the dithering circuit 260 is coupled to an input of a flip-flop 274, which is also clocked by the ADCLK signal. An enable signal 280 is coupled to an enable input of the flip-flop 262 and the flip-flop 274. The output signal of flip-flop 274 carries "previous" data. More particularly, flip-flop 262 contains the newest pixel sample, whereas flip-flop 274 contains the just previously processed pixel sample.

In operation, at each rising edge of the ADCLK signal, a new pixel is clocked into flip-flop 262 and the previously sampled pixel, which was clocked into the flip-flop 262 during the previous clock cycle, is clocked into the flip-flop 274. Stated differently, upon each rising edge of the ADCLK clock signal, the most recently sampled five bit red, green, and blue pixel data is stored in the flip-flop 262 and the previously sampled red, green and blue pixel data is stored in the flip-flop 274.

The output of the flip-flop 262 is coupled to a first input A of two 2:1 multiplexers 276 and 278. The output of the flip-flop 274 is coupled to the second input B of the multiplexers 276, 278. The multiplexers 276 and 278 are responsive to a MUXSEL signal for selecting one of the respective inputs A, B for coupling to the respective output. More particularly, the multiplexer 276 is responsive to an inverted version of the MUXSEL signal, while multiplexer 278 is responsive to the MUXSEL signal itself. The MUXSEL signal is generated by a control circuit 290 in a manner described below. The output of each of the multiplexers 276, 278 is coupled to an I/O register 284, 286, respectively. Registers 284, 286 are clocked by the ADCLK signal and provide the VDA and VDB signals (labelled 56 collectively) at the respective output.

The control circuit 290 includes multiple registers for generating the enable signal 280 and the MUXSEL signal. The control circuit additionally generates an FGACTL2 signal, clock signals VCLK0, VCLK1, VCLK2 and VCLK3, a PIXINL signal 312 and a FRZFRM signal 314. These signals are generated in response to information provided by the processor 200 (FIG. 2) via the data bus 108 and address bus 110, the DATAENA signal provided by the clock generator 150 and the ADCLK signal. The FGACTL2 signal implements the line scaling performed by the data formatter 24 as described above in conjunction with FIG. 2. More particularly, the FGACTL2 signal indicates whether or not lines are to be dropped in accordance with vertical scaling of the incoming video signal. The timing generator 154 modifies the SRTDAT address information in accordance with the FGACTL2 signal. The PIXINL signal 312 indicates whether or not pixel interleaving operation is being performed and is determined by the processor 200 in response to the pixel frequency of an incoming video signal. The FRZFRM signal is generated in response to a command from the processor 200 to freeze the display 30 (i.e., to stop writing information into the frame buffer 58). The processor 200 sets the FRZFRM signal in response to a user actuated command. As noted above, the clock signals VCLK0–VCLK3 control the rate at which data from the bus 56 is clocked into the frame buffers 58 and is generated in response to the ADCLK signal and information provided by the processor 200 regarding whether or not pixel interleaving operation is active.

The enable signal 280 is generated in response to the DATAENA signal, the ADCLK signal and instruction provided by the processor 200 for determining whether or not additional sampling of the digitized signal 42 needs to be performed by the data formatter 24. For example, in the case where the ADCLK signal has a frequency greater than the pixel frequency of the incoming video signal, the pixel data provided to the data formatter 24 is sampled at some sub-multiple of the ADCLK signal. With this information, the enable signal 280 is generated which causes the incoming pixel data to be clocked into the flip flips 262, 274 at the appropriate rate.

The control circuit 290 is further responsive to instructions from the processor 200 via buses 108 and 110 for determining the proper state of the MUXSEL signal, based on the mode of operation. More particularly, during pixel interleaving operation, the MUXSEL signal changes logic state upon each line of a processed frame. Thus, for a given line, the VDA bus always carries either the new or previous pixel sample, while the VDB bus carries the other one of the new and previous pixel sample. During non-pixel interleaving operation, the MUXSEL signal changes state each time data is clocked into the memory banks 66–72. Thus, for the first two pixels provided by the flip-flops 262 and 274, the VDA bus carries the new pixel sample for example and the VDB bus carries the previous pixel sample. Thereafter, once the next two pixels are provided at the outputs of the flip-flops 262 and 274, the VDA bus carries the previous pixel and the VDB bus carries the new pixel sample.

Also provided in the data formatter 24 is circuitry for generating an FGACTL0 signal and an FGACTL1 signal for coupling to the timing generator 154 (FIG. 2). The FGACTL0 and FGACTL1 signals are processed by the timing generator 154 when pixel interleaving is being performed and indicate whether odd or even pixels are being sampled on the presently processed line of an input video signal.

More particularly, a first flip-flop 320 is clocked by the VSYNC signal and provides a PHASE0 output signal at the Q output. The NOT Q output of the flip-flop 320 is fed back to the D input of the flip-flip 320, as shown. The PHASE0 signal toggles logic state at the end of each frame and indicates, for a given frame, whether the subset of captured pixels corresponds to n+m=odd or n+m=even. Considering the checkerboard analogy, the PHASE0 signal indicates whether, for a given frame, black or red squares are being captured. Thus, PHASE0 will be in a first logic state during processing of a first frame and will transition to the alternate logic state upon the processing of the next frame, thereby indicating that if "red squares" are captured for the first frame, "black squares" will be captured for the second frame.

The PHASE0 signal is further coupled to a first input of a 2:1 multiplexer 332, the second input to which receives the NOT Q output of a flip-flop 324. The output of the multiplexer 332 is coupled to the D input of flip-flop 324, which is clocked by the HSYNC signal. The multiplexer 332 is controlled by the VSYNC signal which causes alternating ones of the inputs to be selected for coupling to flip-flop 324 during the processing of each frame. The Q output of the flip-flop 324 provides the PHASE signal which is initialized at the beginning of a frame and thereafter toggles logic state at the end of each line of a processed frame. Note that this PHASE signal can thus be considered to provide the PHASE signal 228 of FIG. 3 which causes the clock signal applied to the analog to digital converters to have the correct "phase" (i.e., to either be identical to the CLK signal or to an inverted version of the CLK signal), depending on which line of a given frame is being processed. The PHASE signal indicates whether, for a given processed line of the input video signal, odd or even pixels are being sampled.

The PHASE signal is coupled to an inverted input of an AND gate 330, a second input to which receives an inverted version of the FRZFRM signal and a third input to which receives the PIXINL signal. The output of the gate 330 provides the FGACTL0 signal which is indicative of odd pixels of the processed line being captured and which is coupled to the timing generator 154 (FIG. 2). More particularly, the FGACTL0 signal will indicate that odd pixels are being sampled as long as pixel interleaving operation is active (i.e., the PIXINL signal is high) and freeze frame operation is not active (i.e., the FRZFRM signal is low).

The PHASE signal is additionally coupled to an input of a second AND gate 340, second and third inputs to which are provided by the inverted FRZFRM signal and the PIXINL signal, respectively. The output of the gate 340 provides the FGACTL1 signal, which is indicative of even pixels of the processed line being captured. The FGACTL1 signal indicates that even pixels are being sampled on the processed line as long as pixel interleaving operation is active and freeze frame operation is not active.

The FGACTL0 and FGACTL1 information is stored in the timing generator 154 while the specified operation is performed by the analog to digital converters 18. The FGACTL0 and FGACTL1 signals are updated in the timing generator upon every HSYNC pulse (i.e., at the end of every line). Once the specified operation is performed (i.e., the appropriate pixels of a line are captured), the timing generator sends the same information to the VRAM controller 62 via the SRTCTL signal in order to inform the controller 62 as to the operation which was previously performed. The VRAM controller 62 passes this data on to the flat panel interface unit 40 via the DATCTL signal 112 which generates an appropriate mask.

Figure 10:
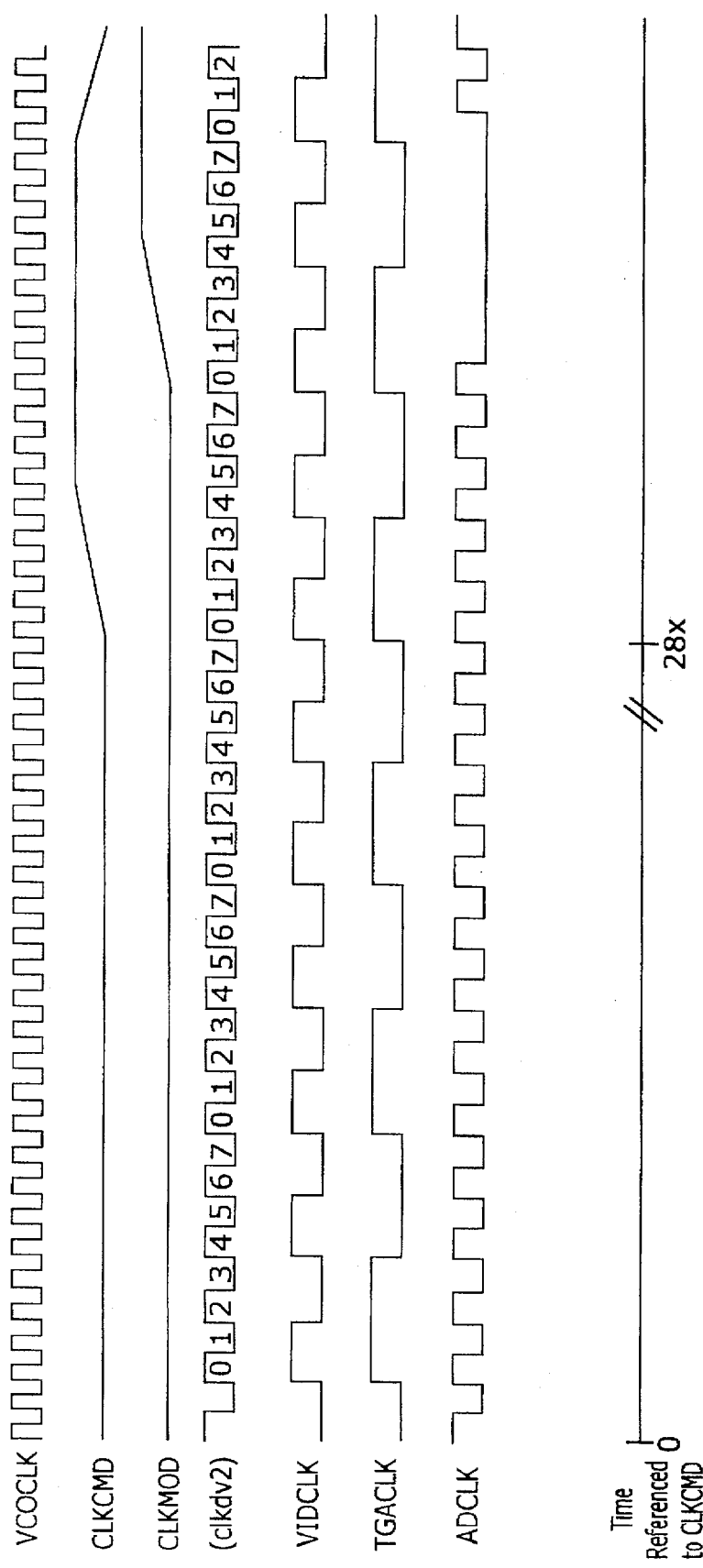
FIG. 10 is a timing diagram illustrating the operation of the clock/timing generator of FIG. 2.

The timing generator 154 additionally provides information related to the FGACTL0 and FGACTL1 signals to the clock generator 150 via the CLKCMD signal (FIG. 10). The CLKCMD signal is used by the clock generator 150 to generate the ADCLK signal with the correct "phase".

Figure 7:
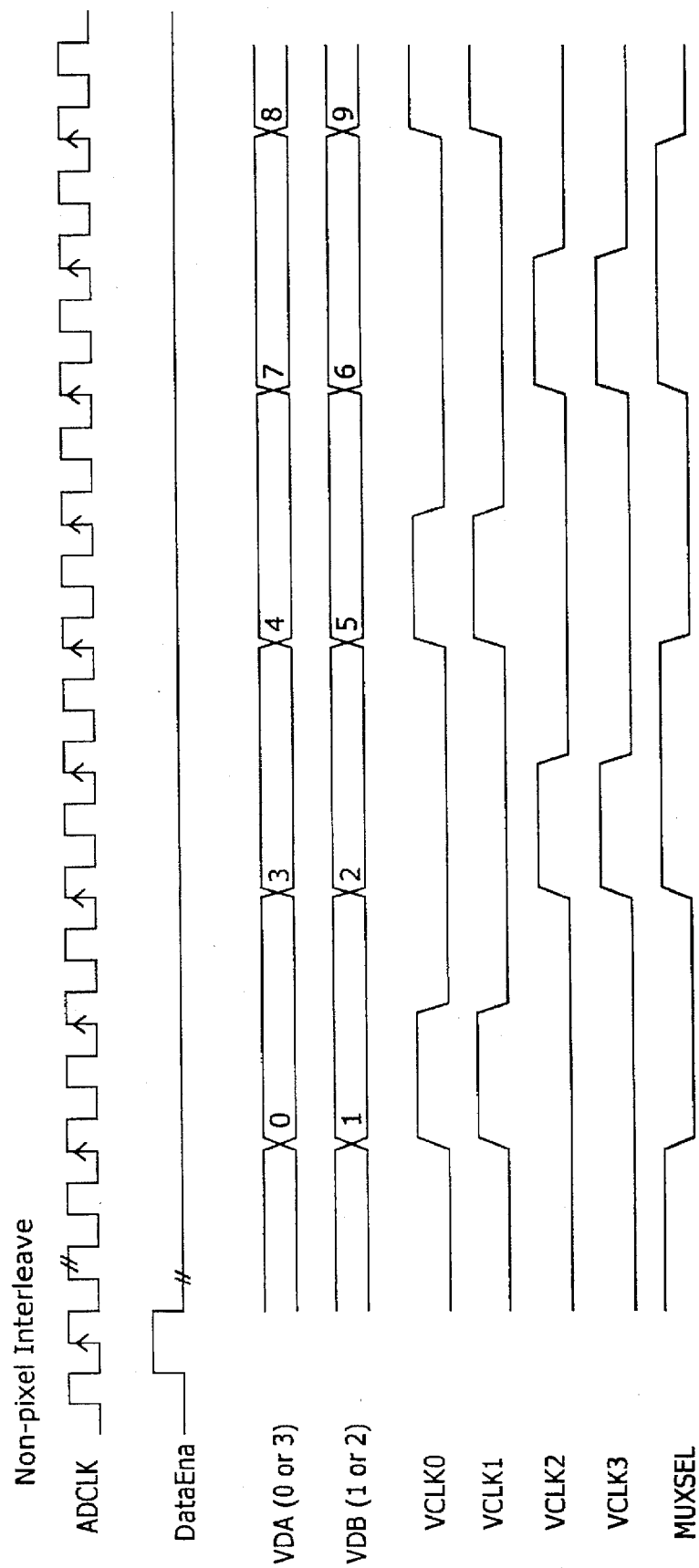
FIG. 7 is a timing diagram illustrating non-pixel interleaving operation of the system of FIG. 2.

Referring to FIG. 7, a timing diagram is shown to illustrate the operation of the data formatter 24 of FIG. 6 when pixel interleaving is not being performed. Upon every fourth rising edge of the ADCLK signal, the I/O registers 284, 286 (FIG. 6) are clocked, thereby updating the data on buses VDA, VDB. During non-pixel interleaving operation, all four memory banks 66–72 are used and data is clocked into Bank0 66 and Bank1 68 simultaneously and into Bank2 70 and Bank3 72 simultaneously.

The ADCLK signal has a frequency of one-half of the frequency of the VCOCLK signal. In the illustrative example, the input video signal will be sampled at a rate of one-half of the ADCLK signal. This is because the ADCLK signal has a frequency of twice the frequency of the input video signal. For example, where the input video signal has a pixel frequency of 20 MHz, since the PLL cannot track frequencies that low, the VCOCLK signal has a frequency of 80 MHz and the ADCLK signal has a frequency of 40 MHz. However, there is no need to sample the input video signal at a rate greater than 20 MHz. Thus, the digitizers 18 sample the input video signal at each rising edge of the ADCLK signal and the data formatter 24 samples the digitized signal further by clocking in only every other pixel sample into the frame buffers 58. To this end, the VCLK0–VCLK3 signals have a frequency of one-quarter of the frequency of the ADCLK signal (rather than one-half, since data is clocked into Bank0 66 and Bank1 68 simultaneously and then into Bank2 70 and Bank3 72 simultaneously).

The resulting pixel samples captured with this arrangement are shown as the VDA and VDB signals. After the first rising edge of the ADCLK signal following the DATAENA pulse, the first pixel (pixel 0) of the input video signal is clocked into the flip-flop 262 and flip-flop 274 is empty. After the second rising edge of the ADCLK signal, the first pixel (pixel 0) of the input video signal is provided at the output of the flip-flop 274 and the second pixel (pixel 1) of the input video signal is provided at the output of the flip-flop 262. With the MUXSEL signal in a first logic state (a logic high state in the illustrative example) to select the second input B of the multiplexer 276 and the first input A of the multiplexer 278, the VDA bus carries a sample of pixel 0 and the VDB bus carries a sample of pixel 1. Upon the rising edge of the respective VCLK0 and VCLK1 signals, the pixel samples are clocked into memory banks 0 and 1 (66 and 68).

Thereafter, the third and fourth pixels (pixels 3 and 4, respectively) of the input video signal are sampled and clocked through the flip-flops 262 and 274 and the MUXSEL signal changes state. Thus, the previous sampled pixel 3 is provided at the output of the flip-flop 274 and the sample of pixel 4 is provided at the output of the flip-flop 262. With the MUXSEL signal in the logic low state, the sample of pixel 3 is provide at the output of multiplexer 276 (and on the VDA bus) and the sample of pixel 4 is provided at the output of multiplexer 278 (on the VDB bus). Such sampled pixels are then clocked into memory banks 2 and 3 (70 and 72) upon the rising edge of the VCLK2 and VCLK3 signals, respectively. The above described operation continues to provide samples of each pixel of the input video signal on the VDA and VDB buses, as shown in FIG. 7.

Figure 8:
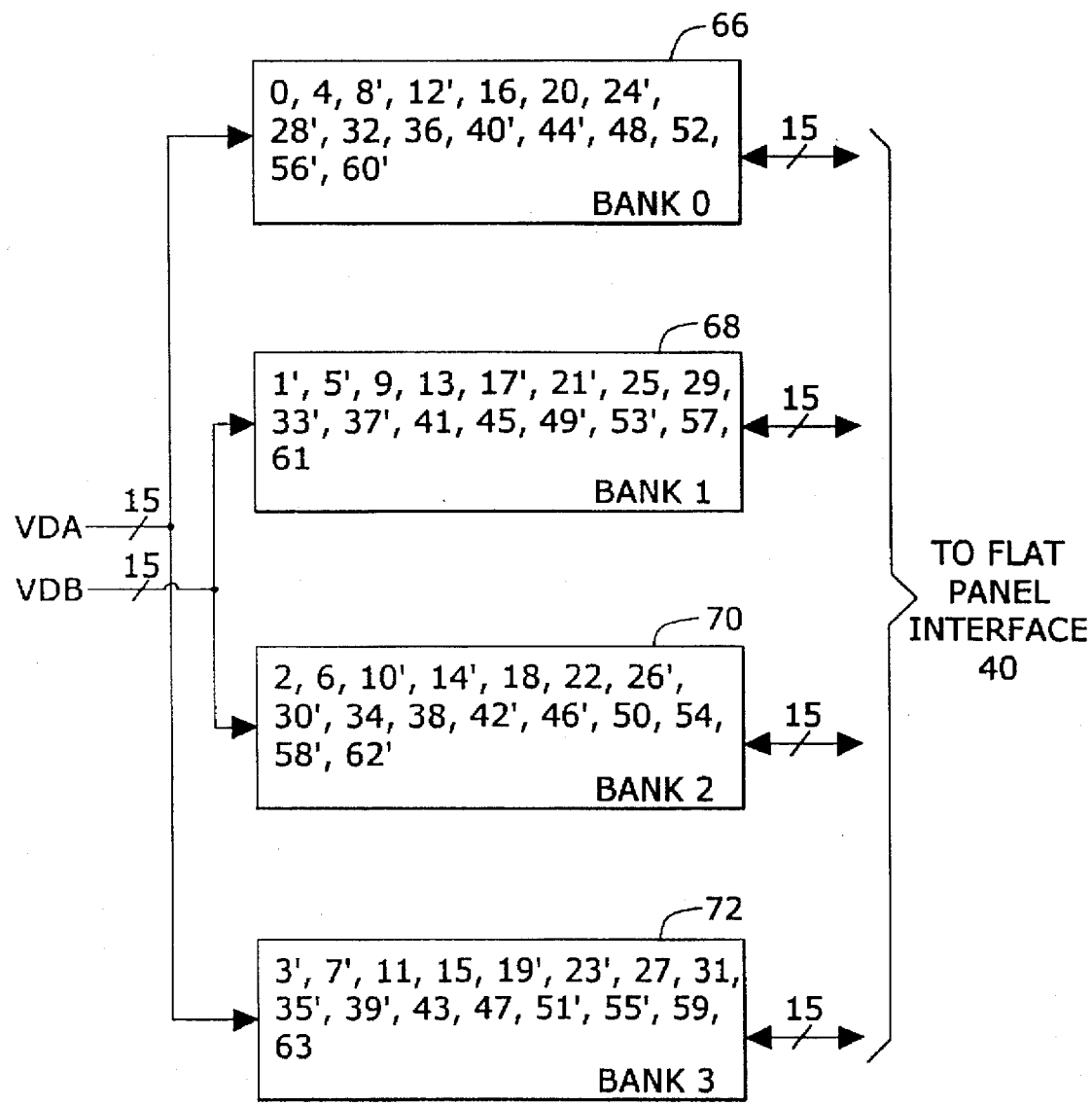
FIG. 8 shows the memory banks of FIG. 2 containing the captured pixels from the first two frames shown in FIG. 5.

Referring also to FIG. 8, each of the memory banks 66–72 of frame buffers 58 is shown. Also shown are the pixel numbers associated with each pixel stored in each of the banks after frames 250 and 252 (FIG. 5) have been processed in accordance with pixel interleaving operation. Recall that in the illustrative embodiment, the first frame 250 is processed so that the subset of captured pixels are those pixels for which n+m=even and the second frame 252 is processed so that the subset of captured pixels are those pixels for which n+m=odd.

Note that the captured subset of pixels from the first and second frames 250, 252 are interleaved in the memory banks so that the pixels can be read out of memory banks sequentially for display. That is, the flat panel interface 40 is able to read out pixels from each of the four memory banks in sequence of bank0 66, bank1 68, bank2 70 and bank3 72. For example, the first four pixels 0, 1', 2 and 3' of display 256 (FIG. 5) are contained in banks 66, 68, 70 and 72, respectively.

Referring to FIG. 9, a timing diagram is shown to illustrate the operation of the data formatter 24 of FIG. 6 during processing of one line of a frame in accordance with pixel interleaving operation. During pixel interleaving, the VCLK0–VCLK3 signals are timed so that, for sampling any given line of a frame, either memory Bank0 66 and Bank2 70 are used or memory Bank1 68 and Bank3 72 are used. For example, when sampling the pixels on line (i.e., row) n=1 of the first frame 250 of FIG. 5, memory Bank0 66 and Bank2 70 are used (see FIG. 8); whereas, when the next line (n=2) of frame 250 is processed, memory Bank1 68 and Bank3 72 are used. Note that while the data on the VDA bus is continuously clocked into the serial shift register of the VRAMs of Bank0 66 and Bank3 72 by the VCLK0 and VCLK3 signals and the data on bus VDB is continuously clocked into the serial shift register of the VRAMs of Bank1 68 and Bank2 70 by the VCLK1 and VCLK2 signals, such data is simply not transferred from the shift register into the dynamic memory of the VRAM when the respective memory bank is unused, in accordance with the mask generation feature described above in conjunction with FIG. 2.

The VCLK0–VCLK3 signals have a frequency which is one-half the frequency of the ADCLK signal, since the pixels will be clocked into the frame buffer 58 at the same rate as the ADCLK signal. That is, clocking pixels into two memory banks simultaneously at the ADCLK signal frequency is equivalent to clocking a single pixel into a single memory bank at ADCLK signal frequency. FIG. 9 illustrates the processing of a line of a frame, in which the even pixels of the line are to be captured (i.e., such as line n=1 of frame 250 of FIG. 5). After the first two ADCLK periods during processing of line 1, pixels 0 and 2 of the input video signal are provided at the outputs of the flip-flops 274, 262, respectively. With the MUXSEL signal in the first logic state, the second input of the multiplexer 276 is selected to provide the sample of the pixel 0 on the VDA bus (at the next rising edge of the ADCLK signal) and the first input of multiplexer 278 is selected to provide the sample of pixel 2 of the input video signal on the VDB bus. Upon the rising edge of the VCLK0 and VCLK2 signals, the sampled pixels 0 and 2 are simultaneously clocked into memory Bank0 66 and Bank2 70, respectively. Two clock cycles later, samples of pixels 4 and 6 are provided on buses VDA and VDB, respectively. And, upon the next rising edge of the VCLK0 and VCLK2 signals, pixels samples 4 and 6 are clocked into memory Bank0 66 and Bank2 70. Operation continues in this manner until all of the even pixels from the first line of the processed frame are stored in memory Bank0 66 or Bank2 70.

Processing of the pixels of a second line of the frame (i.e., such as line n=2 of frame 250 in FIG. 5) is illustrated in FIG. 9A, in which the data from buses VDA and VDB are clocked into memory Bank1 68 and Bank3 72 and odd pixels are captured. More particularly, after the first two periods of the ADCLK signal during processing of line 2, the first and third pixels of the line (i.e., pixel numbers 9 and 11 of frame 250 in FIG. 5) are provided on the VDA and VDB buses. More particularly, the first pixel (pixel 9) is provided at the output of the flip-flop 274 and the third pixel (pixel 11) is provided at the output of the flip-flop 262. With the MUXSEL signal now in the second logic state, the second input to multiplexer 276 is selected to couple the third pixel (pixel 11) to the VDA bus (upon the next rising edge of the ADCLK signal) and the second input to multiplexer 278 is selected to couple the first pixel (pixel 9) to the VDB bus (upon the next rising edge of the ADCLK signal). Upon the next rising edge of the VCLK1 and VCLK3 signals, such first and third pixels (pixels 9 and 11) are clocked into Bank1 68 and Bank2 72, respectively. Thereafter, the next two pixel samples (i.e., the fifth and seventh pixels of the line corresponding to pixels 13 and 15 of frame 250 in FIG. 5) are clocked through the flip-flops 262 and 274 for coupling to buses VDB and VDA, respectively, as shown. The fifth and seventh pixel samples are thereafter clocked into memory Bank1 68 and Bank3 72 upon the next rising edge of the VCLK1 and VCLK3 signals. Operation on the line continues in this manner until all of the odd pixels of the line are captured and stored in memory Bank1 68 and Bank3 72.

Referring to FIGS. 10, a timing diagram of input and output signals associated with the clock generator 150 (FIG. 2) is shown. The VCOCLK signal from the PLL circuit 26 is divided by two, to generate an internal clkdv2 signal. The TGACLK signal is a divided by four version of the clkdv2 signal (i.e., a divided by eight version of the VCOCLK signal). The TGACLK signal provides a clock signal to the timing generator 154.

The clock generator 44 receives a CLKMOD signal and a CLKCMD signal from the timing generator 154 (FIG. 10). In response to the CLKMOD and CLKCMD signals, the clock generator 44 generates the ADCLK signal, a PRELOCH signal and the DATAENA signal.

Recall that during pixel interleaving operation, the phase (i.e., the transition polarity) of the ADCLK signal is toggled at the end of each processed line of video data, in order to cause odd pixels to be sampled on one line and even samples on the next. To this end, the CLKMOD signal transitions between logic high and low states after each line of data is processed. When the CLKMOD signal is in a first state (i.e., for example, in the illustrative embodiment is low), the ADCLK signal mirrors the clkdv2 signal; whereas, when the CLKMOD signal is in the second state, the ADCLK signal is an inverted version of the clkdv2 signal. The CLKCMD signal causes the ADCLK signal to be blanked for a duration necessary to permit the CLKMOD signal to transition. Note that the ADCLK signal is thus a clock signal having the correct "phase", thereby replacing the inverter 220 and multiplexer 224 in the digitizer of FIG. 3. That is, the ADCLK signal may be coupled directly to the clock input terminal of the analog to digital converters.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

We claim:

1. A video signal interface system comprising:

a sampling unit for sampling a video signal comprising a plurality of pixels to capture a first subset of pixels from a first frame of said video signal and for sampling said plurality of pixels to capture a second subset of pixels from a second frame of said video signal; and a display for simultaneously displaying said first subset of pixels of said first frame of said video signal and said second subset of pixels of said second frame of said video signal.

2. The video signal interface system recited in claim 1 wherein said display is updated by replacing said first subset of pixels of said first frame with a subsequent subset of pixels captured from a subsequent frame of said video signal.

3. The video signal interface system recited in claim 2 wherein said sampling unit samples said plurality of pixels to capture a third subset of pixels from a third frame of said video signal and wherein said display is updated by replacing said first subset of pixels from said first frame with said third subset of pixels from said third frame.

4. The video signal interface system recited in claim 1 wherein each of said plurality of pixels has a row number and a column number associated therewith corresponding to the position of said pixel within the respective one of said first and second frames and wherein said first subset of pixels from said first frame includes pixels for which the sum of the respective row and column numbers is a selected one of odd and even and said second subset of pixels from said second frame includes pixels for which the sum of the respective row and column numbers is the other one of odd and even.

5. The video signal interface system recited in claim 1 further comprising a memory device for temporarily storing said first and second subsets of pixels from said first and second frames of said video signal, respectively.

6. The video signal interface system recited in claim 1 wherein said first subset of pixels from said first frame is interleaved with said second subset of pixels from said second frame on said display.

7. The video signal interference system recited in claim 1 wherein said display is a flat panel display.

8. The video signal interface system recited in claim 1 wherein said sampling unit comprises at least one analog to digital converter.

9. A method for processing a video signal comprising a plurality of pixels said method comprising the steps of:

sampling said plurality of pixels to capture a first subset of pixels from a first frame of said video signal;

sampling said plurality of pixels to capture a second subset of pixels from said second frame of said video signal; and displaying said first subset of pixels from said first frame together with said second subset of pixels from said second frame.

10. The method recited in claim 9 further comprising the step of updating said display by replacing said first subset of pixels from said first frame with a subsequent subset of pixels captured from a subsequent frame of said video signal.

11. The method recited in claim 10 further comprising the step of sampling said plurality of pixels to capture a third subset of pixels from said third frame of said video signal and wherein said display is updated by replacing said first subset of pixels from said first frame with said third subset of pixels from said third frame, said third subset of pixels having corresponding locations with said first subset of pixels.

12. The method recited in claim 9 wherein each of said plurality of pixels has a row number and a column number associated therewith corresponding to the position of said pixel within the respective one of said first and second frames and wherein said step of sampling said plurality of pixels to capture a first subset of pixels comprises the step of sampling pixels for which the sum of the respective row and column numbers is a selected one of odd and even and said step of sampling said plurality of pixels to capture a second subset of pixels comprises the step of sampling pixels for which the sum of the respective row and column numbers is the other one of odd and even.

13. The method recited in claim 9 further comprising the step of temporarily storing said first subset of pixels from said first frame and said second subset of pixels from said second frame.

14. The method recited in claim 9 wherein said displaying step further comprises the step of interleaving said first subset of pixels from said first frame with said second subset of pixels from said second frame.

15. The method recited in claim 9 wherein said displaying step comprises the step of displaying said first subset of pixels from said first frame and said second subset of pixels from said second frame on a flat panel display.

16. A video signal interface system comprising:

a sampling unit for sampling a plurality of pixels to capture a first subset of pixels from a first frame of a video signal, wherein uncaptured pixels from said first frame are discarded and for sampling said plurality of pixels to capture a second subset of pixels from a second frame of said video signal, wherein uncaptured pixels from said second frame are discarded; and a display for displaying said first subset of pixels from said first frame together with said second subset of pixels from said second frame.

17. The video interface system recited in claim 16 wherein each of said plurality of pixels has a row number and a column number associated therewith corresponding to the position of said pixels within the respective one of said first and second frames and wherein said first subset of pixels from said first frame includes pixels for which the sum of the respective row and column numbers is a selected one of odd and even and said second subset of pixels from said second frame includes pixels for which the sum of the respective row and column numbers is the other one of odd and even.

18. The video interface system recited in claim 16 wherein said sampling unit comprises at least one analog to digital converter.

19. A method for processing a video signal comprising the steps of:

sampling selected pixels of a plurality of pixels to capture a first subset of pixels from a first frame of said video signal;

discarding uncaptured pixels from said first frame;

sampling selected pixels of said plurality of pixels to capture a second subset of pixels from a second frame of said video signal;

discarding uncaptured pixels from said second frame; and displaying said first subset of pixels from said first frame together with said second subset of pixels from said second frame.

20. The method recited in claim 19 wherein each of said plurality of pixels has a row number and a column number associated therewith corresponding to the position of said pixels within the respective one of said first and second frames and wherein said step of sampling said plurality of pixels to capture said first subset of pixels comprises the step of sampling pixels for which the sum of the respective row and column numbers is a selected one of odd and even and said step of sampling said plurality of pixels to capture said second subset of pixels comprises the step of sampling pixels for which the sum of the respective row and column numbers is the other one of odd and even.

* * * * *